United States Patent Office 3,223,703
Patented Dec. 14, 1965

3,223,703
3-CARBALKOXY- AND 3-CARBAMOYL-5-SUB-
TITUTED - (2H) - 1,2,6 - THIADIAZINE - 1,1-
DIOXIDES AND PROCESS
John B. Wright, Kalamazoo, Mich., assignor to The Upjohn Company, Kalamazoo, Mich., a corporation of Delaware
No Drawing. Filed Aug. 1, 1963, Ser. No. 299,176
23 Claims. (Cl. 260—243)

This invention pertains to novel organic compounds and to a novel process for preparing the same. More particularly, the invention is directed to 3-carbalkoxy- and 3-carbamoyl-5-substituted - (2H) - 1,2,6-triadiazine-1,1-dioxides, and to a novel process which comprises condensing a sulfamide or an alkylsulfamide with an $\alpha,\gamma$-diketo ester.

The novel 3-carbalkoxy- and 3-carbamoyl-5-substituted-(2H)-1,2,6-triadiazine-1,1-dioxides of this invention can be represented by the following structural formula:

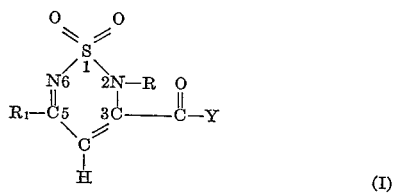

(I)

wherein R is hydrogen or alkyl; $R_1$ is alkyl, aryl, or substituted aryl; and Y is alkoxy, hydrazino, or amino.

More particularly, in accordance with a preferred embodiment of the invention, R is selected from the group consisting of hydrogen and lower-alkyl; $R_1$ is selected from the group consisting of lower-alkyl, phenyl, tolyl, halophenyl, and lower-alkoxyphenyl; and Y is selected from the group consisting of lower-alkoxy, hydrazino, and amino of the formula

wherein $R_2$ and $R_3$ taken separately are selected from the group consisting of hydrogen and lower-alkyl, and taken together with —N< constitute a saturated heterocyclic amino radical

of from 5 to 7 nuclear atoms, inclusive, wherein Z is a saturated bivalent radical selected from the group consisting of alkylene, oxadialkylene, azadialkylene, and thiadialkylene.

As used in this specification, the term "lower-alkyl" means alkyl of from 1 to 6 carbon atoms, inclusive, e.g., methyl, ethyl, propyl, butyl, pentyl, hexyl, and isomeric forms thereof; the term "lower-alkoxy" means alkoxy of from 1 to 6 carbon atoms, inclusive, e.g., methoxy, ethoxy, propoxy, butoxy, pentyloxy, hexyloxy, and isomeric forms thereof; the term "halophenyl" means halogen-substituted phenyl wherein the halogen is selected from chlorine, bromine, iodine, and fluorine; and the term "lower-alkoxyphenyl" means phenyl substituted with alkoxy of from 1 to 4 carbon atoms, inclusive, e.g., methoxyphenyl, ethoxyphenyl, propoxyphenyl, butoxyphenyl, and isomeric forms thereof.

In accordance with this invention, it has now been found that the 3-carbalkoxy- and 3-carbamoyl-5-substituted-(2H)-1,2,6-thiadiazine-1,1-dioxides having the Formula I above are useful as intermediates for reaction with chlorine to produce active-chlorine compounds. Thus for example, the compounds of Formula I wherein R is hydrogen can be reacted with chlorine to produce active-chlorine compounds in which the N-attached hydrogen atom at position 2 is replaced by a chlorine atom. Furthermore, the compounds of Formula I can be catalytically hydrogenated in the presence of a hydrogenation catalyst, e.g., platinum or palladium, to obtain the corresponding 3-carbalkoxy- and 3-carbamoyl-5-substituted-tetrahydro-(2H)-1,2,6-thiadiazine-1,1-dioxides of the formula

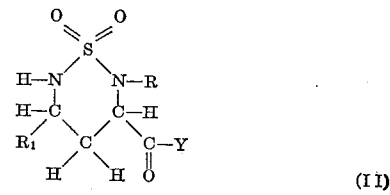

(II)

wherein R, $R_1$ and Y are as defined above. The compounds of Formula II are then reacted with chlorine to produce active-chlorine compounds in which one or two N-attached hydrogen atoms are replaced by chlorine. The degree of chlorination (whether one or two atoms of chlorine) depends upon the identity of R (whether hydrogen or lower-alkyl) as well as whether chlorination is effected with one molecular equivalent of chlorine or with two molecular equivalents. The aforesaid active-chlorine compounds are useful as disinfectants, bleaching agents, and antiseptics.

Further in accordance with the invention, it has now been found that the compounds of Formula I possess useful pharmacologic and therapeutic utilities. Illustratively, N,5-dimethyl-(2H)-1,2,6 - thiadiazine - 3 - carboxamide-1,1-dioxide is active against virus and can be used for treating and preventing viral infections in mammals, birds, animals, and humans. Further illustratively, ethyl-5-(p-tolyl)-(2H)-1,2,6 - thiadiazine - 3-carboxylate-1,1-dioxide is active against neoplastic cells and can be used for treating malignant neoplasms in mammals, birds, animals, and humans. Moreover, ethyl 5-(p-chlorophenyl)-(2H)-1,2,6-thiadiazine-3-carboxylate-1,1-dioxide and 5-(p-chlorophenyl)-(2H)-1,2,6 - thiadiazine - 3 - carboxamide-1,1-dioxide are active as sedatives and are useful for producing sedation in mammals, birds, anmials, and humans.

The novel compounds of Formula I, wherein Y is alkoxy, are prepared by condensing a sulfamide of the formula

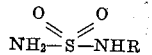

wherein R is as defined above, with an $\alpha,\gamma$-diketo ester of the formula

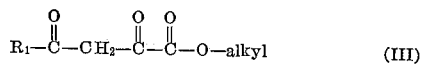

(III)

wherein $R_1$ is as generally defined above. In accordance with a preferred embodiment of the invention, "alkyl" is lower-alkyl and $R_1$ is as more specifically defined above. The reactants are mixed in the presence of an inert reaction medium and acid catalyst. Suitable inert reaction media include methanol, ethanol, isopropyl alcohol, ethanol and water, dioxane, dimethylformamide, dioxane and water, dimethylformamide and water, and the like. Suitable acid catalysts include, for example, hydrogen chloride, sulfuric acid, p-toluenesulfonic acid, hydrogen bromide, and the like. The reaction proceeds satisfactorily at temperatures ranging from about 20° C. up to about 100° C., and, advantageously, the reaction mixture is heated at a temperature in the range of about 60° C. up to about 100° C. in order to assure completion of the of the reaction in a convenient interval of time. The 3-carbalkoxy-5-substituted-(2H)-1,2,6-thiadiazine-1,1-dioxide thus produced is separated from the reaction mixture and recovered in pure form by conventional procedures such as filtration, concentration of the reaction mixture, solvent extraction, and crystallization.

Alternatively, the novel compounds according to Formula I wherein Y is alkoxy and R is alkyl can be conveniently prepared by condensing sulfamide with an $\alpha,\gamma$-diketo ester of Formula III and reacting the thus-produced 3-carbalkoxy-5- substituted - (2H) - 1,2,6-thiadiazine-1,1-dioxide (compound according to Formula I wherein R is hydrogen) with a diazoalkane, e.g., diazomethane, diazoethane, diazopropane, diazobutane, and diazohexane, to produce the corresponding 3-carbalkoxy-5-substituted-(2H)-1,2,6-thiadiazine-1,1-dioxide according to Formula I wherein R is alkyl. The reaction employing the diazoalkane (preferably an ethereal solution thereof) is conveniently effected at temperatures ranging between about 10° C. and about 30° C. in the presence of an inert reaction medium such as methylene chloride, chloroform, carbon tetrachloride, and the like.

The novel compounds of Formula I wherein Y is hydrazino or

as defined above are prepared by reacting a 3-carbalkoxy-5-substituted-(2H)-1,2,6-thiadiazine-1,1-dioxide according to Formula I, preferably a 3-carbomethoxy- or 3-carbethoxy-5-substituted-(2H)-1,2,6-thiadiazine-1,1-dioxide, with hydrazine, ammonia, or a primary or secondary amine using conventional methods commonly employed for effecting aminolysis of esters of carboxylic acids.

The $\alpha,\gamma$-diketo ester starting combounds having the Formula III are readily prepared by a Claisen condensation of a dialkyl oxalate with a methyl ketone of the formula

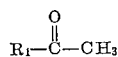

wherein $R_1$ is as generally defined above. [See Hauser et al., "Organic Reactions," vol. 8, pp. 59–187, John Wiley & Sons, Inc., New York (1954)].

The following examples are illustrative of the process and products of the present invention, but are not to be construed as limiting.

EXAMPLE 1

*Preparation of ethyl 5-methyl-(2H)-1,2,6-thiadiazine-3-carboxylate-1,1-dioxide*

A mixture consisting of 15.82 g. (0.1 mole) of ethyl acetopyruvate, 9.6 g. (0.1 mole) of sulfamide, and 100 ml. of absolute ethanol was stirred continuously while anhydrous hydrogen chloride gas was introduced. After the temperature of the reaction mixture had reached 50° C. addition of the hydrogen chloride was discontinued and the mixture was refluxed for 3 hrs. The reaction mixture was set aside for about 15 hrs. and filtered to recover the crude product. The crude product was recrystallized from benzene to give 15.0 g. (68.7% yield) of ethyl 5-methyl-(2H)-1,2,6-thiadiazine-3-carboxylate-1,1-dioxide as colorless prisms melting at 100.5° to 102° C. After two further recrystallizations from benzene the colorless prisms melted at 101.5° to 103° C.

*Analysis.*—Calcd. for $C_7H_{10}N_2O_4S$: C, 38.53; H, 4.62; N, 12.84; S, 14.69. Found: C, 38.75; H, 4.76; N, 12.42; S, 14.77.

Following the same procedure, but substituting methyl acetopyruvate, ethyl propiopyruvate, ethyl butyropyruvate, ethyl enanthropyruvate, butyl acetopyruvate, and isohexyl acetopyruvate for ethyl acetopyruvate, there were prepared methyl 5-methyl-(2H)-1,2,6-thiadiazine-3-carboxylate-1,1-dioxide, ethyl 5-ethyl-, ethyl 5-propyl-, ethyl 5-hexyl-, butyl 5-methyl-, and isohexyl 5-methyl-(2H)-1,2,6 - thiadiazine-3-carboxylate-1,1-dioxide, respectively.

EXAMPLE 2

*Preparation of 5-methyl-(2H)-1,2,6-thiadiazine-3-carboxamide-1,1-dioxide*

A mixture consisting of 15.0 g. (0.069 mole) of ethyl 5 - methyl - (2H) - 1,2,6-thiadiazine-3-carboxylate-1,1-dioxide, 10 ml. of concentrated ammonium hydroxide, and 50 ml. of water was allowed to react at about 25° C. for 17 hrs. The resulting solution was acidified by adding an excess of 1 N hydrochloric acid and the resulting precipitate was recovered on a filter. The filter cake was washed with water and there was thus obtained 7.94 g. (61% yield) of 5-methyl-(2H)-1,2,6-thiadiazine-3-carboxamide-1,1-dioxide as a white solid melting at 238° C. (with dec.). Recrystallization from water gave 6.24 g. of the compound as colorless prisms melting at 243° C. (with dec.).

*Analysis.*—Calcd. for $C_5H_7N_3O_3S$: C, 31.74; H, 3.73; S, 16.95. Found: C, 31.68; H, 3.64; S, 17.00.

EXAMPLE 3

*Preparation of N,5-dimethyl-(2H)-1,2,6-thiadiazine-3-carboxamide-1,1-dioxide*

A mixture consisting of 15.0 g. (0.069 mole) of ethyl 5 - methyl - (2H) - 1,2,6-thiadiazine-3-carboxylate-1,1-dioxide, 50 ml. of water, and 17.4 g. (0.14 mole) of 25% aqueous methylamine was allowed to react at about 25° C. for 16 hrs. The resulting solution was acidified with an excess of 1 N hydrochloric acid and the precipitate that formed was recovered on a filter. There was thus obtained 9.88 g. (70.5% yield) of N,5-dimethyl-(2H)-1,2,6-thiadiazine-3-carboxamide-1,1-dioxide as colorless prisms melting at 240° C. (with dec.). Two recrystallizations from 95% ethanol gave the pure compound melting at 245° C. (with dec.).

*Analysis.*—Calcd. for $C_6H_9N_3O_3S$: C, 35.46; H, 4.46; N, 20.68; S, 15.78. Found: C, 36.05; H, 4.41; N, 20.82; S, 15.84.

This compound is active against Newcastle disease virus propagating in chicken embryo cell cultures.

Following the same procedure, but substituting ethylamine, propylamine, butylamine, pentylamine, hexylamine, diethylamine, dibutylamine, dihexylamine, ethylbutylamine, pyrrolidine, piperidine, 2-methylpyrrolidine, morpholine, thiamorpholine, 4-methylpiperidine, piperazine 1-methylpiperazine and hexamethylenimine for methylamine, there were prepared N-ethyl-5-methyl (2H)-1,2,6-thiadiazine-3-carboxamide-1,1-dioxide, N-propyl-, N-butyl-, N-pentyl-, N-hexyl-, N,N-diethyl-, N,N,-dibutyl-, N,N - dihexyl-, N-ethyl-N-butyl-, N,N - tetramethylene-, N,N - pentamethylene-, N,N-(1-methyltetramethylene)-, N,N,-(3-oxapentamethylene)-, N,N-(3-thiapentamethylene)-, N,N,-(3-methyl-pentamethylene)-, N,N-(3-azapentamethylene)-, N,N-(3-methyl-3-azapentamethylene)-, and N,N - hexamethylene-5-methyl-(2H)-1,2,6-thiadiazine-3-carboxamide-1,1- dioxide, respectively.

EXAMPLE 4

*Preparation of ethyl 5-phenyl-(2H)-1,2,6-thiadiazine-3-carboxylate-1,1-dioxide*

A mixture consisting of 33.0 g. (0.15 mole) of ethyl benzoylpyruvate, 14.4 g. (0.15 mole) of sulfamide, and 150 ml. of absolute ethanol was stirred continuously while anhydrous hydrogen chloride gas was introduced. After the temperature of the reaction mixture had reached 50° C., introduction of the hydrogen chloride gas was discontinued and the reaction mixture was heated at the reflux temperature for 2½ hrs. After cooling and filtering, there was obtained 38.6 g. of ethyl 5-phenyl-(2H)-1,2,6-thiadiazine-3-carboxylate-1,1-dioxide as yellow tinted prisms melting at 185° to 189° C. Two recrystallizations from 95% alcohol gave the pure compound melting at 188° to 190° C.

Analysis.—Calcd. for $C_{12}H_{12}N_2O_4S$: C, 51.42; H, 4.32; N, 10.00; S, 11.44. Found: C, 51.22; H, 4.00; N, 9.61; S, 11.52.

Following the same procedure, but substituting methylsulfamide, ethylsulfamide, propylsulfamide, and butylsulfamide for sulfamide, there were prepared ethyl 2-methyl-, 2-ethyl-, 2-propyl-, and 2-butyl-5-phenyl-(2H)-1,2,6-thiadiazine-3-carboxylate-1,1-dioxide, respectively.

EXAMPLE 5

*Preparation of 5-phenyl-(2H)-1,2,6-thiadiazine-3-carboxamide-1,1-dioxide*

A reaction mixture consisting of 8.4 g. (0.03 mole) of ethyl 5-phenyl-(2H)-1,2,6-thiadiazine-3-carboxylate-1,1-dioxide, 90 ml. of water, and 4.5 ml. (0.068 mole) of concentrated ammonium hydroxide was set aside at about 25° C. for 3 days. The reaction mixture was then acidified with an excess of 1 N hydrochloric acid, and the precipitate that formed was recovered on a filter. There was thus obtained 7.68 g. of crude product as a yellow solid. Recrystallization from 95% ethanol gave 2.0 g. of 5-phenyl-(2H)-1,2,6-thiadiazine-3-carboxamide-1,1-dioxide as yellow prisms melting at 265° C. (with dec.).

Analysis.—Calcd. for $C_{10}H_9N_3O_3S$: C, 47.80; H, 3.61; N, 16.72; S, 12.76. Found: C, 47.99; H, 3.31; N, 16.30; S, 12.89.

EXAMPLE 6

*Preparation of 5-phenyl-(2H)-1,2,6-thiadiazine-3-carboxhydrazide-1,1-dioxide*

A mixture consisting of 5.6 g. (0.02 mole) of ethyl 5-phenyl-(2H)-1,2,6-thiadiazine-3-carboxylate-1,1-dioxide and 10.0 g. (0.2 mole) of hydrazine hydrate was set aside to react at about 25° C. for 18 hrs. The reaction mixture was then acidified with 1 N hydrochloric acid and the precipitate thus formed was recovered on a filter. The filter cake was washed with water and there was thus obtained 5-phenyl-(2H)-1,2,6-thiadiazine-3-carboxhydrazide-1,1-dioxide as a yellow solid melting at 186° C. (with dec.). Recrystallization from water gave 4.47 g. (84% yield) of the compound as yellow tinted needles melting at 185° C. (with dec.).

Analysis.—Calcd. for $C_{10}H_{10}N_4O_3S$: C, 45.11; H, 3.79; N, 21.04; S, 12.04. Found: C, 45.93; H, 3.62; N, 20.35; S, 12.18.

EXAMPLE 7

*Preparation of N-methyl-5-phenyl-(2H)-1,2,6-thiadiazine-3-carboxamide-1,1-dioxide*

A mixture consisting of 4.20 g. (0.015 mole) of ethyl 5-phenyl-(2H)-1,2,6-thiadiazine-3-carboxylate-1,1-dioxide, 15 ml. of water, and 2.72 g. (0.035 mole) of 40% aqueous methylamine was set aside to react at about 25° C. for 17 hrs. The resulting solution was acidified with an excess of 1 N hydrochloric acid and the precipitate that formed was recovered on a filter. The filter cake was washed with water to give 3.72 g. (93.5% yield) of N-methyl-5-phenyl-(2H)-1,2,6-thiadiazine-3-carboxamide-1,1-dioxide as a yellow solid melting at 265° C. (with dec.). Recrystallization from 95% ethanol gave 2.40 g. of the compound as yellow prisms melting at 265° C. (with dec.).

Analysis.—Calcd. for $C_{11}H_{11}N_3O_3S$: C, 49.80; H, 4.18; N, 15.84; S, 12.09. Found: C, 49.91; H, 3.81; N, 15.41; S, 12.15.

EXAMPLE 8

*Preparation of ethyl 5-(p-tolyl)-(2H)-1,2,6-thiadiazine-3-carboxylate-1,1-dioxide*

PART A. ETHYL (p-TOLUOYL)PYRUVATE

To an ethanolic solution of sodium ethoxide (0.54 mole) was added 67.0 g. (0.5 mole) of p-methylacetophenone and 73.0 g. (0.5 mole) of diethyl oxalate during an interval of about 30 minutes. The dark solution that resulted was stirred for 2 hrs. The reaction mixture was diluted with 100 ml. of absolute ethanol and filtered. The filter cake was dispersed in a mixture of 150 ml. of water and 100 g. of cracked ice. Cold sulfuric acid (prepared by adding cracked ice to 20 ml. of concentrated sulfuric acid until some of the ice did not melt) was slowly added to the dispersion until the mixture was acidic. The resulting slurry was stirred for 15 minutes and then extracted four times with 50 ml. portions of benzene. The benzene extracts were combined, treated with a decolorizing agent, and concentrated to dryness under reduced pressure. The residue thus obtained was taken up in 300 ml. of technical hexane (Skellysolve B, a mixture of isomeric hexanes having a boiling range of 140° to 160° Fahrenheit) and filtered. After thorough cooling a cream-colored solid separated which was recovered on a filter. Recrystallization from technical hexane yielded 57.3 g. of ethyl (p-toluoyl)pyruvate as a cream-colored solid melting at 38° to 39° C.

Analysis.—Calcd. for $C_{13}H_{14}O_4$: C, 66.65; H, 6.02. Found: C, 66.99; H, 6.40.

PART B. ETHYL 5-(TOLYL)-(2H)-1,2,6-THIADIAZINE-3-CARBOXYLATE-1,1-DIOXIDE

Following the procedure of Example 4, but using 11.7 g. (0.05 mole) of ethyl (p-toluoyl)pyruvate, 4.8 g. (0.05 mole) of sulfamide, and 50 ml. of absolute ethanol and heating at the reflux temperature for 4 hrs., there was obtained 12.58 g. (85.4% yield) of ethyl 5-(p-tolyl)-(2H)-1,2,6-thiadiazine-3-carboxylate-1,1-dioxide as yellow crystals melting at 162° to 164° C. Two recrystallizations from 95% ethanol gave 8.1 g. of the compound as yellow tinted prisms melting at 176° to 177° C.

Analysis.—Calcd. for $C_{13}H_{14}N_2O_4S$: C, 53.05; H, 4.79; N, 9.52; S, 10.89. Found: C, 53.16; H, 4.64; N, 9.12; S, 10.89.

This compound inhibits growth of in vitro cultured KB tumor cells.

EXAMPLE 9

*Preparation of 5-(p-tolyl)-(2H)-1,2,6-thiadiazine 3-carboxhydrazide-1,1-dioxide*

A mixture consisting of 8.0 g. (0.027 mole) of ethyl 5-(p-tolyl)-(2H)-1,2,6-thiadiazine-3-carboxylate-1,1-dioxide and 27.0 g. (0.54 mole) of hydrazine hydrate was set aside to react at about 25° C. for 18 hrs. The reaction mixture was then acidified with 1 N hydrochloric acid the precipitate that formed was recovered on a filter. The filter cake was washed with water and recrystallized from a mixture of ethanol and dimethylformamide (2:1 by volume) to obtain 5-(p-tolyl)-(2H)-1,2,6-thiadiazine-3-carboxhydrazide-1,1-dioxide as yellow prisms. On another recrystallization from the same solvent, the compound was obtained as yellow prisms melting at 223° C. (with dec.).

Analysis.—Calcd. for $C_{11}H_{12}N_4O_3S$: C, 47.13; H, 4.32; N, 19.99; S, 11.44. Found: C, 47.20; H, 4.52; N, 19.61; S, 11.21.

EXAMPLE 10

*Preparation of ethyl 5-(p-chlorophenyl)-(2H)-1,2,6-thiadiazine-3-carboxylate-1,1-dioxide*

PART A. ETHYL (p-CHLOROBENZOYL)PYRUVATE

Following the procedure of Example 8, Part A, but substituting 77.3 g. (0.5 mole) of p-chloroacetophenone for the p-methylacetophenone, there was obtained 104.0 g. of crude product melting at 58° to 60° C. Recrystallization from isopropyl alcohol (with decolorizing charcoal treatment) yielded 85.5 g. (67% yield) of ethyl (p-chlorobenzoyl)pyruvate as tan prisms having a melting point of 61° to 62.5° C. After a second recrystallization from isopropyl alcohol the melting point was unchanged.

*Analysis.*—Calcd. for $C_{12}H_{11}ClO_4$: C, 56.60; H, 4.35; Cl, 13.92. Found: C, 56.87; H, 4.99; Cl, 13.94.

PART B. ETHYL 5-(CHLOROPHENYL-(2H)-1,2,6-THIADIAZINE-3-CARBOXYLATE-1,1-DIOXIDE

Following the procedure of Example 4, but using 50.8 g. (0.2 mole) of ethyl (p-chlorophenyl)pyruvate, 19.2 g. (0.2 mole) of sulfamide, and 200 ml. of absolute ethanol and refluxing for 5 hrs., there was obtained 51.3 g. of product as yellow tinted prisms melting at 169° to 171° C. After three recrystallizations from 95% ethanol the ethyl 5-(p-chlorophenyl)-(2H)-1,2,6-thiadiazine-3-carboxylate-1,1-dioxide had a melting point of 170.5° to 172.5° C.

*Analysis.*—Calcd. for $C_{12}H_{11}ClN_2O_4S$: C, 45.79; H, 3.52; Cl, 11.26; N, 8.90; S, 10.19. Found: C, 46.30; H, 3.62; Cl, 11.28; N, 8.71; S, 10.15.

This compound when administered to mice at a dosage of 300 mg./kg. produces extreme depression.

EXAMPLE 11

*Preparation of 5-(p-chlorophenyl)-(2H)-1,2,6-thiadiazine-3-carboxamide-1,1-dioxide*

A mixture consisting of 10.0 g. (0.032 mole) of ethyl 5-(p-chlorophenyl)-(2H)-1,2,6-thiadiazine-3-carboxylate-1,1-dioxide, 100 ml. of water, and 4.8 ml. (0.072 mole) of concentrated ammonium hydroxide was set aside to react at about 25° C. for 15 hrs. The reaction mixture was then acidified with 1 N hydrochloric acid and the resulting precipitate was removed by filtration and discarded. The filtrate was acidified further with 1 N hydrochloric acid. There was thus obtained 3.58 g. of product as a pale yellow solid melting at 222.5° C. (with dec.). After recrystallization from water there was obtained 2.39 g. of 5-(p-chlorophenyl)-(2H)-1,2,6-thiadiazine-3-carboxamide-1,1-dioxide as yellow tinted prisms melting at 225° C. (with dec.).

*Analysis.*—Calcd. for $C_{10}H_8ClN_3O_3S$: C, 42.04; H, 2.82; Cl, 12.41; S, 11.22. Found: C, 42.72; H, 2.64; Cl, 12.45; S, 11.05.

EXAMPLE 12

*Preparation of N-methyl-5-(p-chlorophenyl)-(2H)-1,2,6-thiadiazine-3-carboxamide-1,1-dioxide*

A mixture consisting of 3.15 g. (0.01 mole) of ethyl 5-(p-chlorophenyl)-(2H)-1,2,6-thiadiazine-3-carboxylate-1,1-dioxide, 2.48 g. (0.02 mole) of 25% aqueous methylamine, and 30 ml. of water was set aside and allowed to react at about 25° C. for 16 hrs. with stirring. The reaction mixture was acidified with an excess of 1 N hydrochloric acid and the precipitate that was formed was recovered on a filter. There was thus obtained 2.96 g. of crude product as a yellow solid. Recrystallization from 95% ethanol gave 1.64 g. of product as yellow tinted prisms melting at 268° C. (with dec.). A second recrystallization from 95% ethanol gave N-methyl-5-(p-chlorophenyl)-(2H)-1,2,6-thiadiazine-3-carboxamide-1,1-dioxide as yellow tinted prisms melting at 274° C. (with dec.).

*Analysis.*—Calcd. for $C_{11}H_{10}ClN_3O_3S$: C, 44.08; H, 3.36; Cl, 11.83; N, 14.02; S, 10.70. Found: C, 44.39; H, 3.49; Cl, 11.86; N, 13.49; S, 10.58.

This compound when administered to mice at a dosage of 1000 mg./kg. produces extreme depression. The $LD_{50}$ is greater than 1000 mg./kg.

I claim:
1. Compounds having the structural formula:

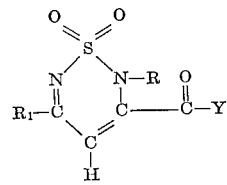

wherein R is selected from the group consisting of hydrogen and lower-alkyl; $R_1$ is selected from the group consisting of lower-alkyl, phenyl, tolyl, halophenyl, and lower-alkoxyphenyl; and Y is selected from the group consisting of lower-alkoxy, hydrazino, and amino of the formula

wherein $R_2$ and $R_3$ taken separately are selected from the group consisting of hydrogen and lower-alkyl, and taken together with the nitrogen atom constitute a saturated heterocyclic amino radical selected from the group consisting of pyrrolidinyl, piperidyl, 2-methylpyrrolidinyl, morpholinyl, thiamorpholinyl, 4-methylpiperidyl, piperazinyl, 4-methylpiperazinyl, and hexamethylenimino.

2. Lower-alkyl 5-lower-alkyl-(2H)-1,2,6-thiadiazine-3-carboxylate-1,1-dioxide.
3. Ethyl 5-methyl-(2H)-1,2,6-thiadiazine-3-carboxylate-1,1-dioxide.
4. Lower-alkyl 5-phenyl-(2H)-1,2,6-thiadiazine-3-carboxylate-1,1-dioxide.
5. Ethyl 5-phenyl-(2H)-1,2,6-thiadiazine-3-carboxylate-1,1-dioxide.
6. 5-phenyl-(2H)-1,2,6-thiadiazine-3-carboxamide-1,1-dioxide.
7. 5-phenyl-(2H)-1,2,6-thiadiazine-3-carboxhydrazide-1,1-dioxide.
8. N-lower-alkyl-5-phenyl-(2H)-1,2,6-thiadiazine-3-carboxamide-1,1-dioxide.
9. N-methyl-5-phenyl-(2H)-1,2,6-thiadiazine-3-carboxamide-1,1-dioxide.
10. 5-lower-alkyl-(2H)-1,2,6-thiadiazine-3-carboxamide-1,1-dioxide.
11. 5-methyl-(2H)-1,2,6-thiadiazine-3-carboxamide-1,1-dioxide.
12. N,5-di-lower-alkyl-(2H)-1,2,6-thiadiazine-3-carboxamide-1,1-dioxide.
13. N,5-dimethyl-(2H)-1,2,6-thiadiazine-3-carboxamide-1,1-dioxide.
14. Lower-alkyl 5-tolyl-(2H)-1,2,6-thiadiazine-3-carboxylate-1,1-dioxide.
15. Ethyl 5-(p-tolyl)-(2H)-1,2,6-thiadiazine-3-carboxylate-1,1-dioxide.
16. 5-(p-tolyl)-(2H)-1,2,6-thiadiazine-3-carboxhydrazide-1,1-dioxide.
17. Lower-alkyl 5-halophenyl-(2H)-1,2,6-thiadiazine-3-carboxylate-1,1-dioxide.
18. Ethyl 5-(p-chlorophenyl)-(2H)-1,2,6-thiadiazine-3-carboxylate-1,1-dioxide.
19. 5-halophenyl-(2H)-1,2,6-thiadiazine-3-carboxamide-1,1-dioxide.
20. 5-(p-chlorophenyl)-(2H)-1,2,6-thiadiazine-3-carboxamide-1,1-dioxide.
21. N-lower-alkyl-5-halophenyl-(2H)-1,2,6-thiadiazine-3-carboxamide-1,1-dioxide.
22. N-methyl-5-(p-chlorophenyl)-(2H)-1,2,6-thiadiazine-3-carboxamide-1,1-dioxide.
23. The process which comprises condensing a sulfamide of the formula

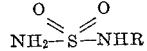

wherein R is selected from the group consisting of hydrogen and alkyl, with an α,γ-diketo ester of the formula

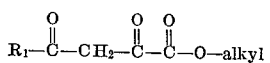

wherein $R_1$ is selected from the group consisting of alkyl, phenyl, tolyl, halophenyl, and lower-alkoxyphenyl to produce an alkyl 5-substituted-(2H)-1,2,6-thiadiazine-3-carboxylate-1,1-dioxide of the formula

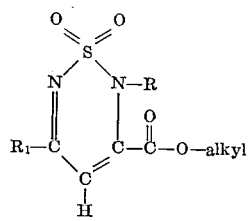

wherein R and $R_1$ are as defined above; and, if desired, reacting the thus-produced alkyl 5-substituted-(2H)-1,2,6-thiadiazine-3-carboxylate-1,1-dioxide with a reagent selected from the class consisting of ammonia, hydrazine, a primary and a secondary amine to produce a 3-carbamoyl-5-substituted-(2H)-1,2,6-thiadiazine-1,1-dioxide.

References Cited by the Examiner

UNITED STATES PATENTS 2,454,262  11/1948  Walter _____ 260—243
2,956,997  10/1960  Teufel _____ 260—243

FOREIGN PATENTS 1,120,457  11/1961  Germany.

OTHER REFERENCES

Degering et al.: "Journal of Organic Chemistry," vol. 17, pp. 339–341 (1952).

WALTER A. MODANCE, *Primary Examiner.*

JOHN D. RANDOLPH, NICHOLAS RIZZO, *Examiners.*